United States Patent [19]

Tsai

[11] Patent Number: 5,645,703
[45] Date of Patent: Jul. 8, 1997

[54] ELECTRODIALYSIS-BASED SEPARATION PROCESS FOR SALT RECOVERY AND RECYCLING FROM WASTE WATER

[75] Inventor: Shih-Perng Tsai, Naperville, Ill.

[73] Assignee: University of Chicago, Chicago, Ill.

[21] Appl. No.: 587,452

[22] Filed: Dec. 20, 1995

[51] Int. Cl.[6] .......................... B01D 61/58; B01D 61/44; B01D 61/46

[52] U.S. Cl. .......................... 204/538; 204/537; 204/544; 204/631; 204/634

[58] Field of Search .................. 204/520, 522, 204/523, 527, 528, 529, 530, 531, 534, 537, 540, 541, 543, 544, 630, 631, 633, 634; 205/746, 748

[56] References Cited

U.S. PATENT DOCUMENTS 5,049,250  9/1991  Chlanda ..................... 204/538 X
5,143,834  9/1992  Glasser et al. ............... 204/529 X

*Primary Examiner*—Kathryn L. Gorgos
*Assistant Examiner*—John S. Starsiak, Jr.
*Attorney, Agent, or Firm*—Cherskov & Flaynik

[57] ABSTRACT

A method for recovering salt from a process stream containing organic contaminants is provided, comprising directing the waste stream to a desalting electrodialysis unit so as to create a concentrated and purified salt permeate and an organic contaminants containing stream, and contacting said concentrated salt permeate to a water-splitting electrodialysis unit so as to convert the salt to its corresponding base and acid.

16 Claims, 4 Drawing Sheets

ELECTRODIALYSIS-BASED SEPARATION PROCESS FOR SALT RECOVERY AND RECYCLING FROM WASTE WATER

CONTRACTUAL ORIGIN OF THE INVENTION

The United States Government has rights in this invention pursuant to Contract No. W-31-109-ENG 38 between the United States Department of Energy and the University of Chicago representing Argonne National Laboratory.

BACKGROUND OF THE INVENTION

1. Field of the Invention

This invention relates to a method for extracting salt from process streams, and more specifically this invention relates to a method for using a membrane-based process to enable the recovery and recycling of acid and base from a corresponding salt from aqueous process streams which also contains organic material.

2. Background of the Invention

Process streams containing a myriad of salts, inorganic compounds and organic compounds are common industrial effluents. For example, in the propylene ammoxidation process which produces acrylonitrile, ammonia and dilute sulfuric acid is used to prevent propylene combustion and to quench the reaction, respectively. Ultimately, an ammonium sulfate waste-stream contaminated with organics is produced. This quench stream containing ammonium sulfate and organics such as acrylic acid, amide and other nitriles is the major waste water stream from the process.

Other major petrochemical processes, such as caprolactam production via the Beckman rearrangement process, and methacrylate production via acetone conversion, and the production of many other intermediate or specialty chemicals, also produce waste water containing ammonium salts contaminated with organics.

Aside from ammonium salt presence, other salts also pose problems. In the production of polycarbonates, via bisphenol conversion for example, a contaminated sodium chloride waste stream is produced and sodium hydroxide is used in the process. In bioprocessing, the manufacture of several organic acids such as citric, gluconic, lactic acid, plus the manufacture of the amino acids such as lysine, alanine, valine, leucine, proline, methionine and generally the essential and nonessential amino acids produce waste salts, or gypsum in the conventional recovery process. In the pharmaceutical and fine chemical manufacturing industry, waste stream constituent recovery and purification problems also exist, for example in salicylic acid production.

Processes exist for the purification of bases from materials containing base and salt, such processes disclosed in U.S. Pat. Nos. 5,135,626 and 5,228,962 to Mani et al. However, these process are designed to recover salts from streams containing excess base and/or acid.

Other processes, such as those disclosed in U.S. Pat. Nos. 4,740,281, 4,999,095, 5,198,086 and 5,200,046 to Chlanda et al., disclose the use of bi-polar membranes to electrodialytically convert salts to their respective acids and bases. However, these and other disclosures generally deal with the use of such membranes to reclaim acids and bases from inorganic pickling liquors. U.S. Pat. No. 5,352,345 to Byszewski et al. discloses a process whereby a combination of electrodialysis units are employed to reclaim exhausted regenerating solutions used to regenerate ion exchange gels and resins. Generally, the prior art does not address the significant problem of the presence and removal of organic contaminants from waste streams which contain salts, and in fact, given the nature of bipolar membranes, the prior art tends to teach away from reclaiming salts found in contaminated streams.

A need exists in the art for an economical process to recover, purify and convert salts in waste water streams into their respective acids and bases. The process would also enhance the biological treatability of any organic contaminants contained in the waste streams.

SUMMARY OF THE INVENTION

It is an object of the present invention to provide a process for recovery and conversion of salt that overcomes many of the disadvantages of the prior art.

Another object of the present invention is to provide a process to economically recover salts from a waste stream that is also contaminated with organic compounds. A feature of the invention is its applicability to water reclamation processes. An advantage of the invention is enhancing the biological treatability of the organic materials contained in the waste stream of processes by decreasing the metabolic interference of nitrogen groups. Another advantage is the recovery of high purity acids and bases for reuse.

Still another object of the present invention is to provide an economical process to produce highly pure acids and base. A feature of the invention is an integrated membrane configuration consisting of a plurality of electrodialysis membranes that are specific for waste stream constituents. An advantage of the invention is that multiple stages are provided for organic compound removal from a concentrated stream of salt. Another advantage of the multiple ED approach is the interim production of concentrated salt streams, thereby enhancing the efficiency of bi-polar membrane processes.

Briefly, the invention provides for a method for recovering salt from a waste stream containing organic contaminants comprising directing the waste stream to a desalting electrodialysis unit so as to create a concentrated salt permeate and an organic compound containing stream, and contacting said concentrated salt permeate to a water-splitting electrodialysis unit so as to convert said salt to its corresponding acid and alkali.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE INVENTION

The invented process utilizes advanced electrodialysis (ED) separation technologies. Generally, the process combines desalting ED, which uses high-efficiency cation- and anion-exchange membranes, with water splitting ED, which uses novel high-efficiency bipolar membranes. The novelty of the invented integrated membrane approach is multifaceted. One facet includes the generation of a concentrated and highly purified salt stream. This concentrated salt stream significantly improves the efficiency of the water-splitting electrodialysis process which occurs downstream from the salt concentration step.

Another facet of the dual membrane process is its high efficiency in removing organic contaminants so that even higher purity acids and bases are rendered if and when a subsequent polishing step is employed after the water-splitting electrodialysis process.

Figure 1:
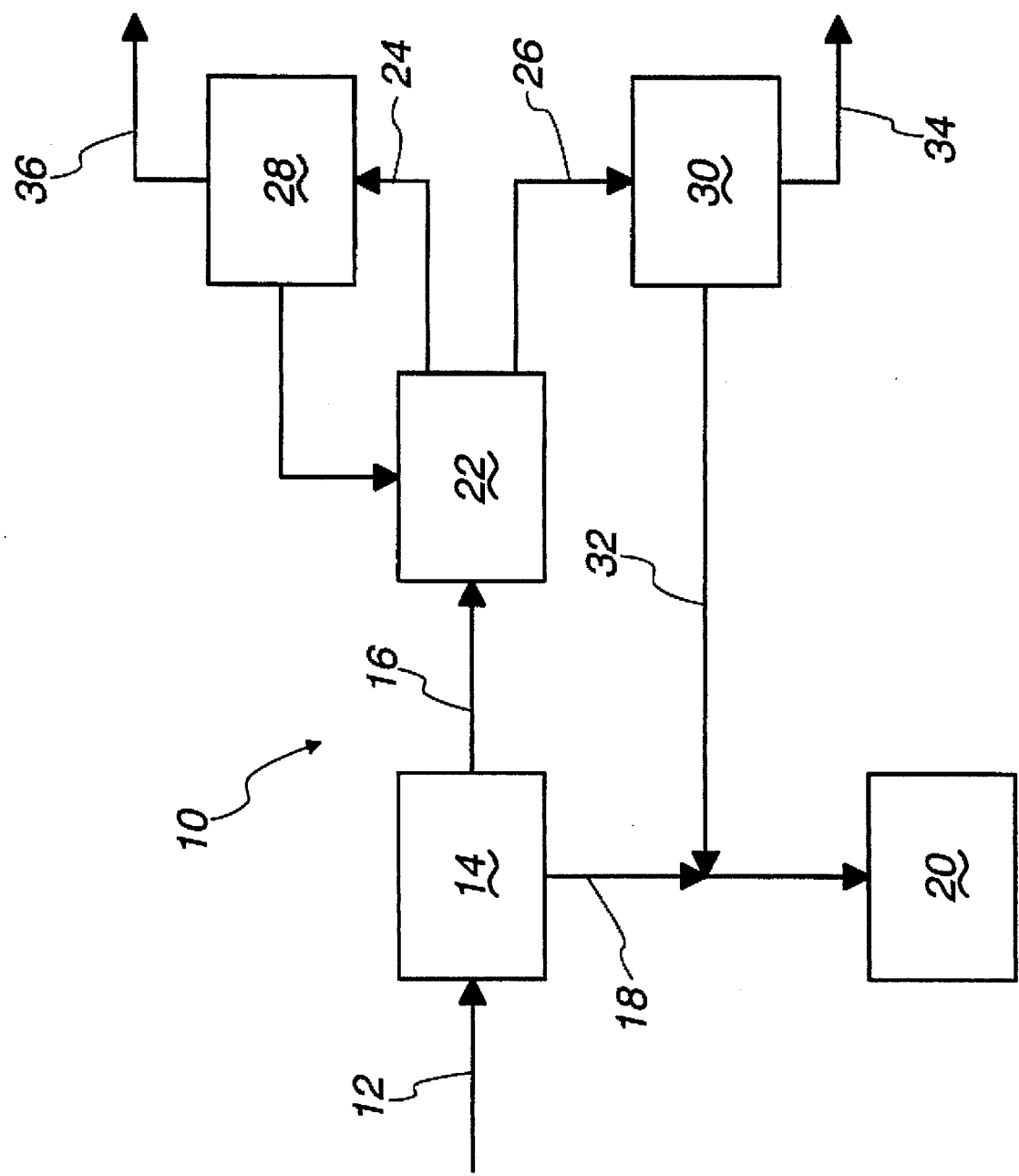
FIG. 1 is a diagram of the integrated electrodialysis membrane process, in accordance with the present invention.

One exemplary embodiment of the invented process is depicted as numeral 10 in FIG. 1. A process stream 12 containing the target salts and organics is directed to a first electrodialysis unit 14. The first electrodialysis unit 14 serves to separate the waste stream into charged and uncharged components. As such, a first treated stream 16 emerges from the first electrodialysis unit 14 containing salt, ionized salt and a small fraction of the contaminating organics. A second treated stream 18 emerges from the first electrodialysis unit 14 containing the majority of the organic contaminants. This first separation process results in a 2 to 2.5 concentration of the salt in the first treated stream 16.

The second treated stream 18 is directed to a biological waste reactor 20 for further treatment. This reactor 20 can embody any standard nonionic contaminant containment/treatment options, including but not limited to biological treatment, chemical treatment, thermal treatment, or deep well injection.

The concentrated salt stream, or first treated stream 16 is contacted with a second electrodialysis unit 22 which facilitates cleavage of salt into its cationic component stream and an anionic component. The second electrodialysis unit 22 also splits water to provide hydrogen ion to react with the anionic component moieties contained in the anionic component stream (such as sulfate ion) to form an acid stream 26. In instances of acrylonitrile production stream clean-ups, the acid stream 26 may also contain acrylic acid. Additionally, hydroxyl ion from the water splitting process reacts with moieties contained in the cationic component stream (ammonium ion, for example) to form an alkali stream 24 that is essentially free of any organics.

Optionally, for ammonia, the alkali stream 24 is further treated in a base polishing step, embodied by a first evaporation or stripper unit 28, so as to remove the volatile ammonia from the primarily aqueous alkali stream 24. Also as an option, the acid stream 26 is further treated in an acid polishing step, embodied by a second evaporation/adsorption/stripping unit 30 or an adsorption unit, to generate a weak acid stream 32 containing volatile acids such as acrylic acid and a strong acid stream 34 containing non volatile acids, such as sulfuric acid.

As illustrated in the examples, infra, the invented process is useful for the recovery and purification of a myriad of salts, including ammonium sulfate, sodium chloride, ammonium chloride and sodium sulfate from organic-contaminated waste water process streams. Such organic contaminants include, but are not limited to acrylates, propylene, amides, amines, ketones, aldehydes, hydrocarbons, surfactants, natural polymers, synthetic polymers, and salts of organic acids such as acetate, lactate, propionate, butyrate, and formate. Overall, the invented process is very beneficial to the economics, future operability and expandability of acrylonitrile, caprolactam, polycarbonate, methacrylate production and the production of intermediate and specialty chemicals, particularly as waste-treatment and salt-disposal regulations become more stringent. The process has significant utility in the cleaning of waste streams which are generated by processes wherein an acid process stream is neutralized by a base, or vice versa. The process is particularly suitable in purifying process streams having salts present in concentrations ranging from between 0.1N and 10N.

The inventor has found that the process can be operated in a myriad of temperatures, generally selected from a range of between approximately 0°–80° C., and preferably at temperatures at or below 55° C.

Electrodialysis Units Detail

Electrodialysis is a membrane-based separation process in which ions are transported from one solution through a membrane into another solution by application of an electrical driving force. Two electrodialysis units are employed in the invented process. The first unit is a desalination or deionization unit, and the second unit is a bi-polar or water splitting unit. Such units are described throughout the literature, such as in *Membrane Handbook*, Eds. W. S. Winston Ho, Ph.D. and Kamalesh K. Sirkar, Ph.D. (Van Nostrand Reinhold, New York, ©1992), pp. 220–222, 260–261, and incorporated herein by reference.

Figure 2:
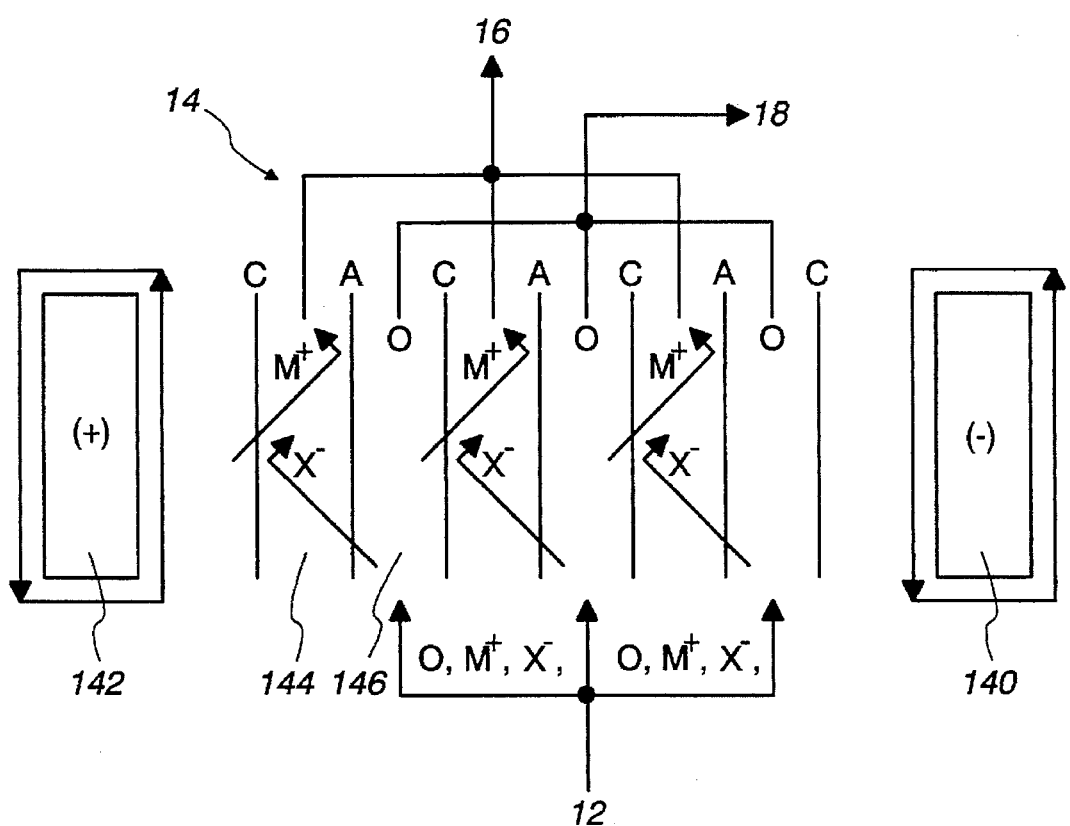
FIG. 2 is a schematic diagram of a desalting electrodialysis unit, in accordance with the present invention.

As is illustrated in FIG. 2, the first electrodialysis unit 14 consists generally of a number of thin compartments through which solutions containing dissolved electrolytes are pumped. These compartments are separated by alternate cation-exchange membranes (C) and anion-exchange membranes (A), which are separated by thin spacers. The end compartments contain electrodes. This configuration of membrane compartments with flow channels and electrodes is called a cell-stack. When electric current is passed through the cell-stack, the ions transport the charge, and the cations migrate toward the cathode 140 while the anions migrate toward the anode 142. When the feed solution 12 containing strongly ionized species, such as salts (M+X−), mixed with non-ionized or weakly ionized components (O) is passed through the feed compartments, the cations (M+) and anions (X−) pass freely through the cation- and anion-exchange membranes that form the walls of concentrate compartments or tanks 144. However, once the ions are in the concentrate tanks 144, their further transport is blocked in as much as the cation-exchange membranes do not allow the transport of anions and the anion-exchange membranes do not allow the transport of cations. Thus, ionized salts are removed from the feed and concentrated in the concentrate compartments. This ionized concentrate comprises the first permeate or first treated stream 16. The remaining, nonionic, non-permeated feed stream material, dwelling in dilution compartments or tanks 146, comprise the second treated stream 18.

Figure 3:
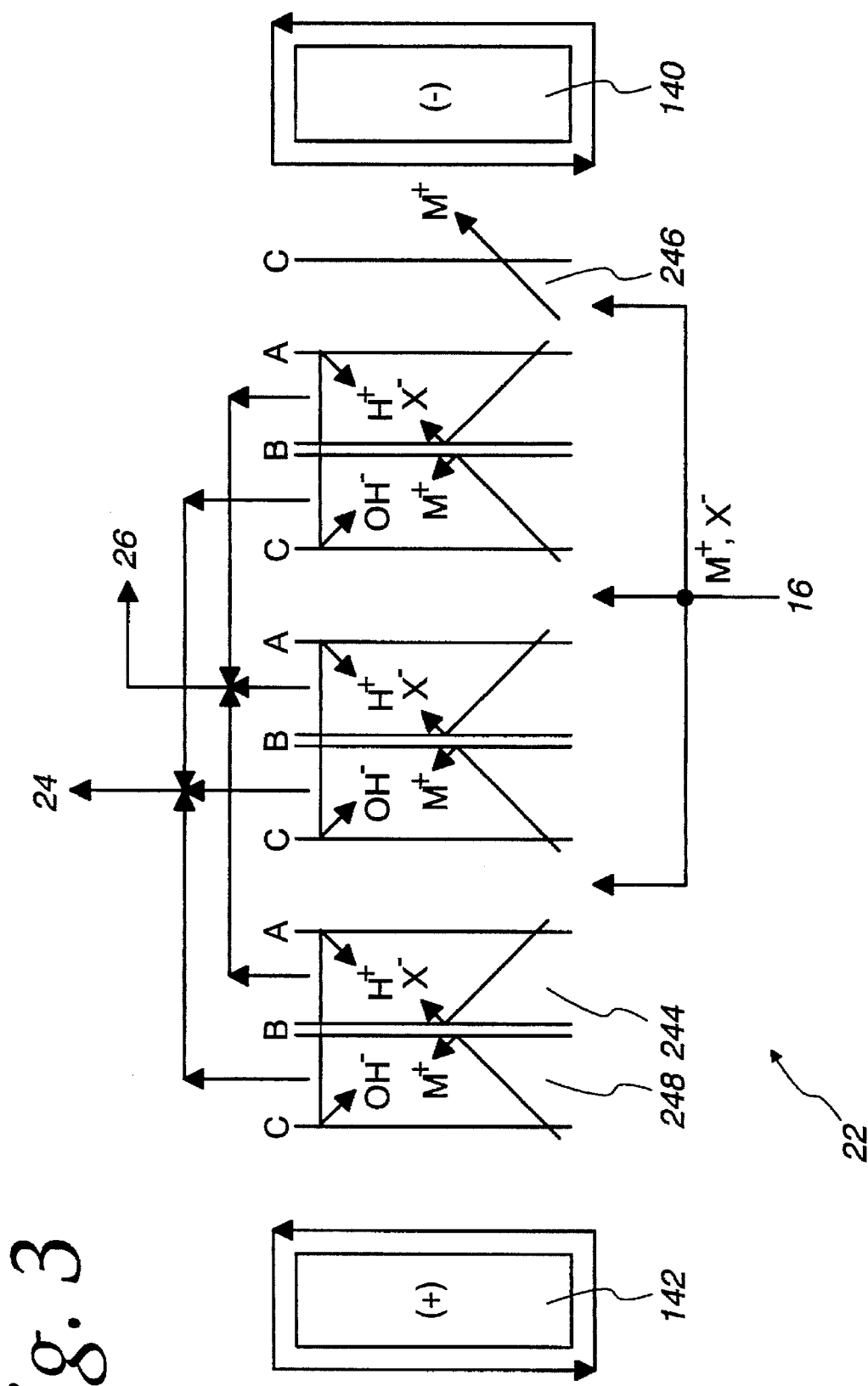
FIG. 3 is a schematic diagram of a three-compartment water splitting electrodialysis unit, in accordance with the present invention.

The second electrodialysis unit 22, illustrated in FIG. 3, generates acid and base from salt by the use of bipolar membranes (B). These membranes consist of specially formulated layers of permselective ion-exchange materials and possess the capability of splitting water molecules to hydroxyl and hydrogen ions with high current efficiency and low power consumption. At the interface between the two permselective ion-exchange layers, water is split to H+ and OH− ions which carry the current and are transported toward the cathode and anode, respectively. When bipolar membranes are configured in cell compartments with other cation-exchange membranes (C) or anion-exchange membranes, the generated H+ and OH− ions convert salts to their corresponding acid and base. For example, with ammonium sulfate in the concentrate stream 16, ammonium hydroxide and sulfuric acid are produced after the stream 16 is contacted with the second electrodialysis unit 22. In as much as typical anion exchange membranes normally allow passage of protons (H+), current efficiencies are further increased when proton-blocking anion exchange membranes, such as the ACM membrane available from Tokuyama Corp. Tokyo, Japan, are incorporated in this second electrodialysis unit 22.

In some instances, for example when the salt which is present is a salt of strong acids, the efficiency of the water splitting step is increased by a three-compartment cell configuration, designated as 22 in FIG. 3. This configuration has an anion-exchange membrane juxtaposed between a cation-exchange membrane and the proton (H+) releasing side of the bipolar membrane. Feed salt stream 16 compartments 246 are thereby defined by the cation exchange (C) and anion exchange (A) membrane surfaces, whereby the compartments 246 receive incoming concentrated salt stream 16 generated in the first electrodialysis process. Furthermore, the configuration results in a product acid compartment 244, being defined by the surfaces of the anion-exchange membranes and the bipolar membranes, whereby the product acid compartments 244 allow for the formation of purified acids from component permeated anions and protons to form the acid stream 26. Product base compartments 248, defined by the cation exchange membrane surface and the bipolar membrane surface, facilitate the formation of purified base from component, permeated cations and hydroxide ion, resulting in the base stream 24.

The process associated with the second electrodialysis unit 22 should not be confused with electrolysis which generates hydrogen and oxygen gas from water and requires much more energy. Rather, the theoretical energy requirement for water splitting is 0.83 V and some of the recent membranes can perform close to 70 percent theory, i.e., at 1.2 V.

This invented double ED process requires a certain amount of hardness control of the first treated stream 16, in as much as operation of the second electrodialysis unit 22 is enhanced at hardness levels of 1 part-per-million or less. Monovalent selective cation exchange membranes (such as the CMS membrane manufactured by Tokuyama Corp.) effectively reject multivalent cations such as calcium and magnesium and therefore result in more regulated hardness levels in the concentrated salt solution, herein designated as the first treated stream 16. The first treated stream can also be treated with chelating resins, such as Duolite C-467 and Amberlite IRC-719 (both of Rohm and Haas of Philadelphia, Pa.), to further reduce hardness levels.

Figure 4A:
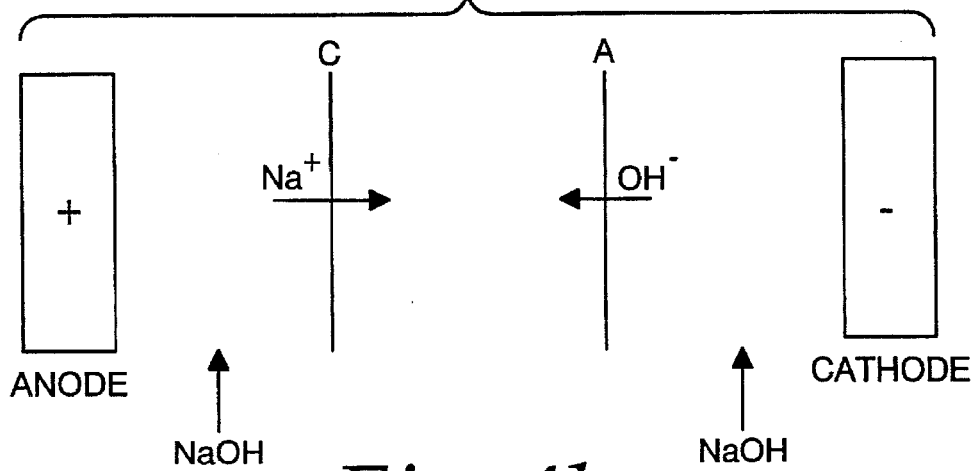
FIG. 4 is a schematic diagram of three electrode rinse processes, in accordance with the present invention.
Figure 4B:
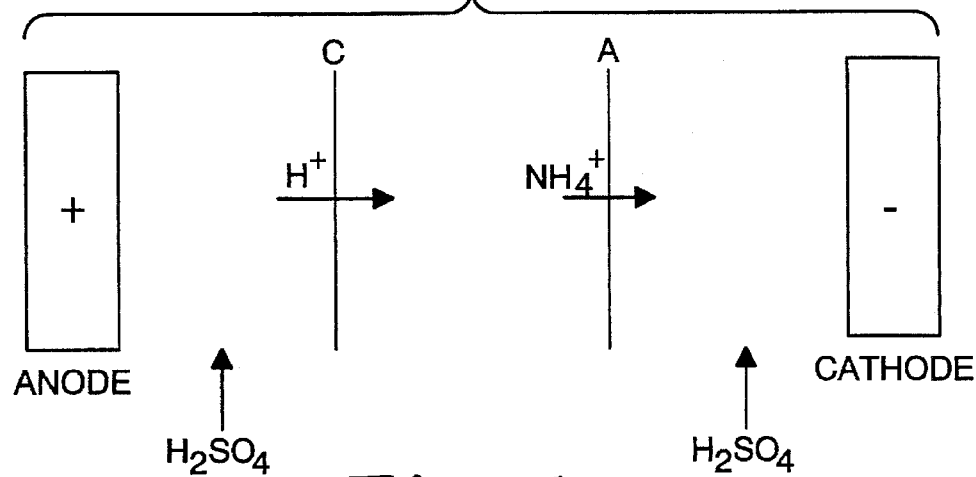
Figure 4C:
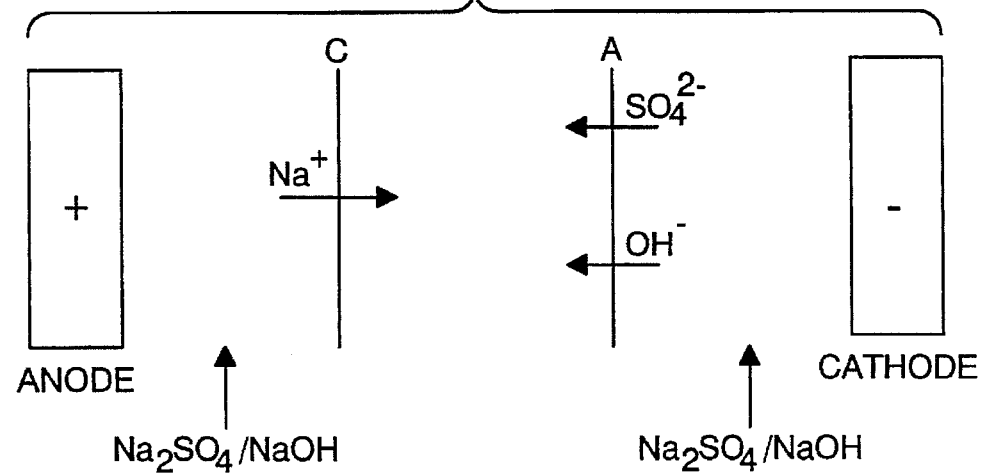

In electrodialysis processes, some exchange or transport of ions between the electrode rinse and process streams (e.g. diluting and concentrating streams in the desalting process) takes place to maintain the continuity of the electrical current. In situations wherein ammonium is the major cation of the waste stream, it is necessary to prevent ammonium transport from the process stream into the anode rinse, in as much as ammonium is known to cause corrosion of the electrode material (such as platinum on titanium) under anodic conditions. FIG. 4a–c shows three methods to prevent the transport of ammonium into the anode rinse by proper selection of the electrode rinse compositions (i.e. NaOH, $H_2SO_4$, and $Na_2SO_4$/NaOH) and membranes adjacent to the electrodes. In these three methods, the anode rinse and cathode rinse are two separate streams, even when they appear to have the same composition. The selection of the electrode rinse solutions is based on considerations of how the ions from the rinse solutions will effect the pH and purity of the process streams.

Generally, the invented process 10 recovers 95 percent or higher of salt (and consequently the corresponding base and acid). Thus, the salt level in the waste organic stream is reduced by 20-fold. After treatment with the second electrodialysis unit, a resulting purified ammonia stream 36 is produced after the base polishing step 28, which is free of organic compounds. The sulfuric acid stream 34, which is produced after the acid polishing step embodied by the second purification unit 30, after acrylate removal, is approximately 15 percent concentrated. Greater than 80 percent of the water from the initial waste stream 12 and essentially all of the organics go into the second treated stream 18 for treatment and discharge.

For illustration only, the following examples present a number of different process streams, treatable with the invented method. While each of the process streams contain specific concentrations and types of organic compounds, it should be noted that the process is not limited by these types and concentrations; rather, the applicability of the invented method is wide spread and encompasses a myriad of non-ionic, organic contaminants and concentrations.

EXAMPLE 1

Acrylonitrile Process Waste Stream

A typical acrylonitrile process waste water, having the composition disclosed in Table 1 below, and at pH 5 was used in this example.

TABLE 1

| Process Stream of Acrylonitrile Production |
|---|
| 1. 40 g/L of Ammonium sulfate; |
| 2. 2 g/L Acrylic acid; |
| 3. 3 g/L Maleimide; |
| 4. 6 g/L Fumaronitrile; and |
| 5. 0.9 g/L Acrylamide. |

Approximately 10 liters of this process stream was treated in a desalting ED system. A TS-2 stack (Tokuyama Corp.) was used, with 10 cell pairs, each consisting of a monovalent selective cation-exchange membrane (CMS, Tokuyama) and a low-resistance anion-exchange membrane AM-1, also from Tokuyama Corp. This process stream and 3 liters of a 10 g/L ammonium sulfate solution were placed in diluting and concentrating tanks, respectively. The diluting and concentration tanks are internal portions of the first electrodialysis unit 14. The final solution leaving the concentration tank 144 comprises the first treated stream 16 containing concentrated salt, while the solution leaving the diluting tank 146 becomes the second treated stream 18 containing organics. A three (3) percent sodium sulfate solution was used as the electrode rinse solution. All three solutions were recirculated through the respective compartments of the electrodialysis stack.

To start the separation process, a direct current was applied to the stack at an initial current density of 50 $mA/cm^2$. Generally, the inventor has found that current densities ranging from approximately 10 $mA/cm^2$ to 100 $mA/cm^2$ produce good results. Conductivities of the diluting and concentrating solutions were monitored continuously and the process was stopped when the diluting stream conductivity dropped to a value of approximately 2.9 milliSiemens per centimeter (mS/cm).

Four and one-half (4.5) liters of a concentrated (75.5 g/L) and partially purified ammonium sulfate solution was obtained as the concentrate product of this desalting ED step. The desalting ED unit, 14, removed more than 95 percent of the ammonium sulfate from the feed 12 with a current efficiency of more than 90 percent; current efficiency being the measure of separation achieved relative to the amount of electrical charge applied over time (i.e., current multiplied by time). The power consumption was 0.1 kWh/lb of ammonium sulfate.

The resulting concentrate was fed to a second electrodialysis unit 22, such as a two-compartment water-splitting ED system using the TS-2 stack with the two-component cation cell configuration, consisting of Tokuyama's bipolar membrane BP-1 and low resistance cation-exchange membrane CM-1. A 20 g/L ammonium sulfate solution was placed as the initial base stream and the electrode rinse solution was a three percent sodium sulfate solution. A D.C. current was applied to the stack at a current density of 100 mA/cm$^2$. Generally, current densities selected from a range of between approximately 20 mA/cm$^2$ to 250 mA/cm$^2$, are suitable. During the process, ammonium ions were separated from the feed stream, generating an ammonium hydroxide stream and a sulfuric acid stream. The water-splitting run was ended after 66 percent ammonium removal with a final pH of 0.04 in the salt/acid stream. The current efficiency was 51 percent and the power consumption was 0.80 kWh/lb of ammonium sulfate treated.

UV/Vis spectra of the feed 12 and treated streams 16, 24, 26 were obtained and used as an indication of stream purity. The feed process stream 12 exhibited a broad absorbance in 220–270 nm, primarily due to the various organic contaminants. The spectrum of the desalted water stream 18 (final diluting stream of desalting ED step) showed that most of the UV-absorbing organics remained in the desalted feed, whereas the spectrum of the ED concentrate (final concentrating stream of the desalting ED step) showed that the recovered ammonium sulfate was partially purified and contained only small amounts of such organics (estimated to be approximately 15 percent of the total amounts initially present in the feed.) The spectrum of the hydroxide stream 24 showed a single peak of ammonium hydroxide. In addition, the feed process stream 12 and the desalted stream 18 were analyzed for total organic carbon (TOC) and the results showed that 71 percent of TOC remained in the desalted stream. These data illustrate that ammonia with a good purity is recovered using the double ED process. For the organics present in the desalted water, treatability data from an EPA database (EPA RREL Treatability Database, Version 5.0, Apr. 14, 1994, developed by EPA Risk Reduction Engineering Laboratory, Cincinnati, Ohio.) suggest that they would be biodegradable using acclimated cultures.

EXAMPLE 2

Sulfuric Acid/Acrylic Acid Waste Stream Application

Example 2 illustrates the feasibility of using the optional acid polishing step 30 to further purify the acid stream that is generated via the process illustrated in Example 1. An acid stream 26 comprising a solution of 14 percent sulfuric acid and 1 percent acrylic acid was processed. In this instance the acid polishing step 30 was demonstrated in a 50 ml column of activated carbon (Calgon Type CPG 12×40). Aside from activated carbon, other adsorbing means, such as polymeric resins, are also suitable.

The carbon was degassed in 85° C. water and the packed column was washed with deionized water, 1 percent sulfuric acid and finally deionized water, again.

225 ml of the acid stream 26, was passed through the column at the loading rate of 5 ml/min. The first 25 ml of the effluent was the void volume and was discarded. Subsequently, the effluent was collected in 50 ml fractions.

UV/Vis spectra were taken for a 15 percent sulfuric acid solution, 0.5 percent acrylic acid solution, and the feed solution, and the data showed that sulfuric acid does not have any significant absorbance in the wavelength range of 200–1,100 nm, whereas acrylic acid has strong absorbance in the 250–280 nm range. UV/Vis spectra data were therefore used as an indication of sulfuric acid purity. Spectra data were also collected for the carbon-treated effluent fractions 34 (except the void column). The data showed that the effluent was essentially free of acrylic acid. The acrylic acid concentration in the last fraction was estimated to be about 0.03 percent (or 3 percent of initial acrylic acid concentration).

The carbon column was then regenerated using 50 ml of deionized water, 100 ml of 6 percent $NH_4OH$, and 50 ml of deionized water. Samples taken during $NH_4OH$ washing and the final deionized water washing showed strong absorbance at 250–280 nm, matching the absorption pattern of ammonium acrylate.

EXAMPLE 3

Polycarbonate Process Stream

As noted supra, the invented method is applicable to many other organic contaminated process streams. A typical process stream of polycarbonate production, having the composition shown in Table 2, below, was used to demonstrate the invention's utility.

TABLE 2

| Components of Typical Polycarbonate Process Stream | |
|---|---|
| Methyl-isobutyl ketone | 1.5 g/L; |
| Sodium chloride | 35.2 g/L; |
| Sodium carbonate | 4.8 g/L; and |
| Triethylamine hydrochloride | 1.0 g/L. |

Operational conditions for the desalting and water splitting process are depicted in Table 3 below. The electrodialysis stack used for desalting was a TS-2, and for water splitting, a TS3B, both available through Tokuyama. Two consecutive desalting runs were performed.

Both runs were started with 15 liters of fresh feed with the same composition as disclosed in Table 2. The second run used the concentrating product from the first run as the initial concentrating stream to further concentrate sodium chloride. One water splitting ED run was performed using the final concentrating product from desalting ED as the feed. Electrode rinse solutions were 3 percent sulfuric acid and 3 percent sodium sulfate, for the cathode and anode, respectively.

TABLE 3

| Exemplary Operational Parameters for Polycarbonate Process Stream Treatment | | |
|---|---|---|
| | Desalting | Water splitting |
| Current | 10 Amps | 20 Amps |
| Current density | 50 mA/cm$^2$ | 100 mA/cm$^2$ |
| Membrane | AM1/CMS* | AM1/CM1/BP1* |

TABLE 3-continued

Exemplary Operational Parameters for
Polycarbonate Process Stream Treatment

|  | Desalting | Water splitting |
|---|---|---|
| Cell Pairs | 10 | 5 |
| Voltage | 10–16 Volt | 11–15 Volt |
| Temperature | 35° C. | 35° C. |
| Flow Type | Sheet flow | Sheet flow |
| Linear Velocity | 5 cm/s | 6 cm/s |
| Flow rate |  |  |
| diluate | 0.8 Gpm | 0.4 Gpm |
| concentrate | 0.8 Gpm | 0.4 Gpm |

*Tokuyama membranes

Experimental runs were monitored off-line. Stack and cell voltages, conductivity, liquid volume, pH, flow rate and flow pressure of each stream, current and temperature were recorded every five minutes to 30 minutes throughout the entire experimental period. Temperature, pH of anolyte during desalting ED, current, and the voltage applied into the ED system were controlled. Each run was operated initially at the constant current mode and later switched to a constant voltage mode.

During the experimental runs, liquid samples of 30 ml were taken from each compartment and electrolytes every 30 minutes, and stored in room temperature. These samples were then analyzed off-line for total organic carbon (TOC), anions and cations, and concentrations of hydrochloric acid and sodium hydroxide.

The results of the application of the invented integrated ED process are depicted in Table 4, below.

TABLE 4

Results of Polycarbonate Stream Treatment Using
Invented Process.

| Concentration | Desalting | Water Splitting |
|---|---|---|
| Recovered NaCl | 147 (g/L) |  |
| NaCl in Exhausted feed | 2.6–2.8 (g/L) |  |
| Recovered Product |  |  |
| Acid (HCL) |  | 1.35N |
| Base (NaOH) |  | 2.13N |
| Cell Voltage Drop (each pair) | 0.41–0.8 volt | 1.29–1.72 volt |

As the results show, sodium chloride was concentrated four fold, from 35.2 g/L to 147 g/L during the desalting ED run. Desalted waste stream contained less than 2.9 g/L of sodium chloride. A total of 95 percent of sodium chloride was removed from the initial feed 12 and recovered in the concentrating stream 16 through the desalting ED process. Final concentrations of 1.35N of hydrochloric acid and 2.13N of sodium hydroxide were obtained via the water splitting step. These water splitting component streams also contained less than five (5) parts-per-million (ppm) of organic carbons as TOC, as depicted in table 5, below. The organics transported into the concentrating stream in the desalting run was negligible.

TABLE 5

Total Organic Carbons (TOC) in Polycarbonate Process
Feed and Product Streams Rendered by the Invented
Integrated Two-membrane Process.

| Stage | Initial in feed (mg/L) | Final in conc. salt (mg/L) | Final in acid prod. (mg/L) | Final in base prod. (mg/L) | Initial TOC transp. into final prods. |
|---|---|---|---|---|---|
| Desalting: | 578–1121 | <5 | — | — | <0.14% |
| Water Splitting: | <5 | — | <5 | <5 | ND |
| Overall: | — | — | — | — | <0.14% |

Power consumption of the integrated membrane process is low. As disclosed in Table 6, below, power consumption for sodium chloride recovery during the desalting stage was 0.12 kwh/lb. Overall power consumption was 0.93 kwh/lb of HCl produced or 0.65 kwh/lb of NaOH produced.

TABLE 6

Power Values of Integrated Electrodialysis
Process for Acid/Base Recovery from
Polycarbonate Waste Streams.

|  | Energy Consumption (kwh/lb) |
|---|---|
| Desalting (NaCl recovered): | 0.12 |
| Water Splitting: |  |
| HCl Produced | 0.60 |
| NaOH Produced | 0.42 |
| Overall Process |  |
| HCl Produced | 0.93 |
| NaOH Produced | 0.65 |

Current efficiencies were 92 percent during desalting (based on salt recovered), and during water splitting the values were 70 percent for acid and 92 percent for base, respectively.

EXAMPLE 4

Ammonium Sulfate Recovery from Organics-
contaminated Stream

The invented process was applied to a caprolactam production waste stream. The constituent of the stream, having a pH of approximately 7, is disclosed in Table 7, infra.

Fifteen liters of the simulated waste water was treated first in a desalting electrodialysis (ED) stack system (TS-2 stack, available through Tokuyama Corp.). The stack contains 10 pairs of cation and anion exchange membranes (CMS and AM-1, respectively, from Tokuyama). In addition, two cation-exchange membranes (CMX and CMH from Tokuyama) are placed adjacent to the cathode and anode, respectively, to separate the electrode rinse solution from the process streams. The electrode rinse solutions were 3 weight percent of sodium sulfate for the anode and 2 weight percent sulfuric acid solution for the cathode.

During the ED desalting process, the process stream was circulated through the system from a diluting tank and 3 liters of initial 10 g/L ammonium sulfate solution was circulated from the concentrating tank. The solution temperatures in both of the diluting and concentrating tank were controlled at 35° C. An initial current density of 50 mA/cm$^2$ was applied into the stack to carry out the separation process. The process was stopped when the conductivity of the diluting stream dropped to a low value of approximately 2–10 mS/cm.

TABLE 7

| Typical Caprolactam Process Stream Subjected to Integrated Electrodialysis Method. | |
|---|---|
| Ammonium Sulfate | 200.0 g/L; |
| Caprolactam | 5.0 g/L; |
| Cyclohexane | 0.1 g/L; |
| Cyclohexanol | 1.0 g/L; and |
| Cyclohexanone | 1.0 g/L |

The ammonium ion concentration was analyzed by ammonia gas electrode (Fisher Scientific Company) and the sulfate ion concentration was obtained from ion chromatography using DIONEX 5000, of Dionex, Inc., (Sunnyvale, Calif.). A final 7.6 liters of 292.5 g/L ammonium sulfate was obtained in the concentrating tank. The desalting ED system removed 99.6 percent of the ammonium sulfate from the initial waste water with a current efficiency of 93.1 percent. The power consumption was 0.073 kWh/lb of recovered ammonium sulfate in the concentrating stream.

After the desalting ED process, the concentrating stream (i.e., recovered ammonium sulfate solution) was fed into the three-compartment water splitting ED system (TS3B-5 available from Tokuyama) to further separate the ammonium sulfate to generate ammonium hydroxide and sulfuric acid for recycling the product. The stack was packed with five sets of bipolar membrane (BP-1), low resistant cation exchange membrane (CM-1) and anion exchange membrane (AM-1). Initially three different streams were fed into three tanks used in the water splitting ED system. There were 5 liters of ammonium sulfate solution from the desalting ED run in the salt tank, 8 liters of 0.1N sodium hydroxide in the base tank, and 8 liters of 0.1N sulfuric acid in the acid tank. The electrode rinse solutions were 1N sodium hydroxide for both the anode and cathode. 100 mA/cm$^2$ current density was applied to the system for separation.

During the process, the ammonium sulfate salt was separated, generating an ammonium hydroxide in the base compartment and a sulfuric acid in the acid compartment. The process was terminated when the acid compartment had reached 2.0N concentration of sulfuric acid. Based on ammonium hydroxide production, current efficiency was 34 percent. Based on the sulfuric acid production, efficiency was 64 percent. The two-fold discrepancy observed was probably due to low resistivity of the cation exchange membrane used, and out-gassing of NH$_4$OH to the atmosphere due to imperfect tank sealing. The power consumption of the water splitting step was 0.462 kWh/lb of treated ammonium sulfate salt. The total energy consumption was 0.64 kWh/lb of acid produced from the water splitting stage, and 1.56 kWh/lb of base produced in the water splitting stage.

The amount of organics in the process stream was analyzed by a total organic carbon (TOC) analyzer (TOC 5000A, available by Shimadzu of Columbia, Md.). The initial simulated waste water fed into the desalting ED system contained 3,773 mg/L of TOC. After the first stage of the desalting ED process, only 6.5 percent of TOC (346 mg/L) in the initial waste water feed remained in the final concentrated ammonium sulfate stream. During the second stage or water-splitting ED process, 11 percent of the remaining TOC in the concentrated ammonium sulfate solution (from the first stage, or desalting ED process) was found in the concentrated ammonium hydroxide and sulfuric acid production streams. Less than 5 percent of TOC was found in the acid product, and approximately 23 mg/L of TOC was found in the base product. Overall, only 0.7 percent of the TOC in the initial waste water remained in the final production streams.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for recovering purified acid, alkali, and organic compounds from a process stream which contains salts and organic contaminants comprising:
   a.) directing the process stream to a desalting electrodialysis unit so as to create a concentrated salt permeate and a de-salted organic compound containing stream;
   b.) contacting said concentrated salt permeate to a water-splitting electrodialysis unit so as to convert said salt to its corresponding base and acid; and
   c.) biologically treating the de-salted organic compound containing stream.

2. The method as recited in claim 1 wherein the process stream is an aqueous stream.

3. The method as recited in claim 1 wherein the salt is selected from the group consisting of ammonium sulfate, sodium chloride, ammonium chloride, sodium sulfate, potassium sulfate, potassium chloride, ammonium nitrate, sodium nitrate, potassium nitrate, and combinations thereof.

4. The method as recited in claim 3 wherein the concentration of salt in the process stream ranges from approximately 0.1N to 10N.

5. The method as recited in claim 1 wherein the desalted organic compound containing stream is 95 percent salt free.

6. The method as recited in claim 1 wherein the desalting electrodialysis unit is subjected to a current density selected from a range of between approximately 10 mA/cm$^2$ to 100 mA/cm$^2$.

7. The method as recited in claim 1 wherein the water splitting electrodialysis unit is subjected to a current density selected from a range of between approximately 20 mA/cm$^2$ to 250 mA/cm$^2$.

8. The method as recited in claim 1 wherein the method is conducted at temperatures ranging from between approximately 0°–80° C.

9. A method for recovering purified acid and alkali from a process stream which contains salts and organic contaminants comprising:

a.) directing the process stream to a desalting electrodialysis unit so as to create a concentrated salt permeate and an organic compound containing stream; and b.) contacting said concentrated salt permeate to a water-splitting electrodialysis unit so as to convert said salt to its corresponding base and acid, wherein the process stream is the result of acrylonitrile production processes.

10. A method for recovering purified acid and alkali from a process stream which contains salts and organic contaminants comprising:

a.) directing the process stream to a desalting electrodialysis unit so as to create a concentrated salt permeate and an organic compound containing stream; and b.) contacting said concentrated salt permeate to a water-splitting electrodialysis unit so as to convert said salt to its corresponding base and acid, wherein the process stream is the result of caprolactam production.

11. A method for recovering purified acid and alkali from a process stream which contains salts and organic contaminants comprising:

a.) directing the process stream to a desalting electrodialysis unit so as to create a concentrated salt permeate and an organic compound containing stream; and b.) contacting said concentrated salt permeate to a water-splitting electrodialysis unit so as to convert said salt to its corresponding base and acid, wherein the process stream is the result of methacrylate production.

12. A method for recovering purified acid and alkali from a process stream which contains salts and organic contaminants comprising:

a.) directing the process stream to a desalting electrodialysis unit so as to create a concentrated salt permeate and an organic compound containing stream; and b.) contacting said concentrated salt permeate to a water-splitting electrodialysis unit so as to convert said salt to its corresponding base and acid, wherein the process stream is the result of polycarbonate production processes.

13. The method as recited in claim 1 wherein the process stream is the result of processes in which an acidic process stream is neutralized by a base.

14. The method as recited in claim 1 wherein the stream is the result of processes in which a basic process stream is neutralized by an acid.

15. The method as recited in claim 1 wherein the organic contaminants are selected from the group consisting of acrylates, propylene, amides, amines, ketones, aldehydes, hydrocarbons, natural polymers, synthetic polymers, and combinations thereof.

16. A method for recovering purified acid and alkali from a process stream which contains salts and organic contaminants comprising:

a.) directing the process stream to a desalting electrodialysis unit so as to create a concentrated salt permeate and an organic compound containing stream; and b.) contacting said concentrated salt permeate to a water-splitting electrodialysis unit so as to convert said salt to its corresponding base and acid, wherein the process stream is the result of salicylic acid production processes.

* * * * *